Patented May 7, 1940

2,199,576

UNITED STATES PATENT OFFICE 2,199,576

PROCESS FOR THE SELECTIVE REDUCTION OF AZO COMPOUNDS

Swanie S. Rossander, Wilmington, Del., assignor to E. I. du Pont de Nemours & Company, Wilmington, Del., a corporation of Delaware No Drawing. Application July 27, 1939, Serial No. 286,775

5 Claims. (Cl. 260—166)

This invention relates to processes for the selective and partial reduction of nitro-substituted tetrakisazo compounds, and especially to processes for selectively reducing the nitro groups of tetrakisazo compounds, such nitro groups being present in the residues after diazotization and coupling of nitroanilines, said compounds being the type represented by the formula

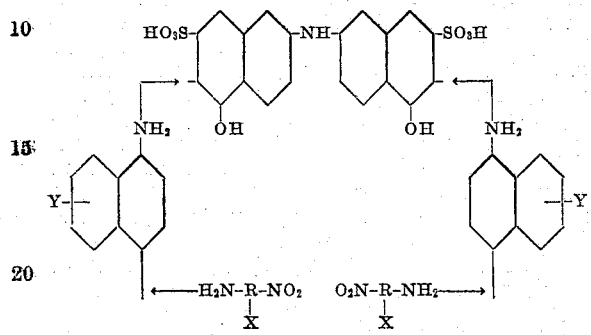

in which R is a benzene nucleus, $NO_2$ is meta or para to amino, X is one of a group consisting of hydrogen, alkyl, alkoxy, halogen, carboxy and sulfonic acid, and Y is the sulfonic acid group.

The nitro substituted compounds which are used as starting materials in the new process are known compounds but as far as I am aware no satisfactory method was heretofore known whereby the nitro groups of these compounds could be completely reduced to amino groups without unduly reducing the azo groups. The amino substituted tetrakisazo compounds of the type described are valuable dyes for cotton, and especially valuable dyes which have outstanding fastness to washing are produced when they are tetrazotized and coupled on the fiber with suitable coupling components, such as beta naphthol, provided, however, that the nitro groups are completely reduced and adventitious compounds are not present in the dyes. When the reduction is not selective, products resulting from partially reducing the azo groups of the parent compounds are present, and the dyes are unsatisfactory because of dullness, poor fastness and other defects. Compounds similar to the products of the present process are known. These products are made by hydrolyzing acylamino groups originally present in the starting diazo components of the corresponding acylamino-substituted tetrakisazo compounds. The latter hydrolyzed compounds are quite satisfactory products but there is considerable advantage in starting with the corresponding nitro-substituted tetrakisazo compounds and then reducing the nitro groups. It was therefore desirable to provide improved processes for completely and selectively reducing the nitro groups in the intermediate compounds described.

It is among the objects of this invention to provide improved methods for completely and selectively reducing the nitro groups in the nitro-substituted compounds described. Another object of the invention is to provide processes for improving the quality of the amino-substituted tetrakisazo compounds referred to. Another object of the invention is to provide suitable reduction processes which will give improved yields. Still other objects of the invention will be apparent from the following description.

The objects of the invention are accomplished in general by carrying out the reduction in basic medium comprising an aqueous solution of an alkali metal chloride in such concentration that the major portions of the product and the compound to be reduced remain suspended in the medium and then acting on the nitro-substituted compounds with sodium sulfhydrate until the nitro groups are reduced.

The invention will be more fully set forth in the following more detailed description which includes examples that are given as illustrative embodiments of the invention and not as limitations thereof.

Example I 4-nitro-aniline-2-sulfonic acid (218 parts) was diazotized at approximately 10° C. by adding sodium nitrite (69.2 parts) in the presence of water (4000 parts) and hydrochloric acid (100 parts 100%). The resulting diazo solution was added to a solution which had been prepared with water (3000 parts), 1-naphthylamine-6-sulfonic acid (223 parts), sodium carbonate (53 parts) and sodium acetate (150 parts). The temperature was maintained between 10° and 20° C. by the addition of ice.

The above prepared monazo combination was, without isolation, rendered just alkaline to Brilliant Yellow and after the addition of sodium nitrite (84 parts), was immediately treated with hydrochloric acid (255 parts 100%). These operations were conducted at approxiately 0° C., ice being added to maintain this temperature.

The above prepared diazo solution was rapidly added to a well stirred mixture of water (about 5000 parts), 5,5'-dihydroxy-2,2'-dinaphthylamine-7,7'-disulfonic acid (220 parts) and sodium bicarbonate (718 parts). The total volume was equal to that of about 28000 parts of water.

The resulting dinitro-tetrakisazo dye was, with or without isolation, reduced under the conditions that are described in the following examples.

Example II

The product of a charge similar to that of Example I was treated with sodium chloride (2250 parts). The separated dye was removed by filtration and was washed with 8% sodium chloride solution.

The press cake from the filtration was stirred with water (23,000 parts). The resulting solution containing some suspended matter was made basic by adding sodium hydroxide (100 parts 100%) and then reduced at 85° C. by the addition of sodium sulfhydrate (63 parts 100%). The reduction required about an hour.

Sodium bicarbonate (150 parts) and sodium chloride (6000 parts) were then added and the precipitated dye was removed by filtration. It was washed with 20% sodium chloride solution. Subsequently, it was dried at 80° C.

Example III

The procedure of Example II was used with the following exceptions: Sodium sulfide (87 parts 100%) was used in the place of the sodium sulfhydrate, and the sodium hydroxide was omitted.

The results were, in general, similar to the results of Example II.

Example IV

The product of a charge similar to that of Example I was isolated under essentially the same conditions as those described under Example II.

The press cake from the filtration was stirred with 30% sodium chloride solution (20,000 parts) which had been heated to 85° C. The charge was made just alkaline to Clayton Yellow with sodium hydroxide and sodium sulfhydrate (89 parts of 100%) was added rapidly. A temperature of 83°–85° C. was maintained for an hour.

The dye was removed by filtration and was washed with 20% sodium chloride solution. The filtration was much more rapid than the filtrations of Examples II and III. The filter cake was dried at 80° C.

The dye which was obtained from this charge was much higher in tinctorial strength than the products of Examples II and III, and gave blue cotton dyeings, both with and without diazotization and development on the fiber with beta naphthol, which were consistently greener and brighter in shade than those obtained from the products of Examples II and III. The yield, based upon color value, was approximately 80% higher than the corresponding yields of Examples II and III.

Example V

The solution of the tetrakisazo dye obtained as in Example I was treated with sodium chloride (7000 parts) and then heated to 83° C. There then was added sufficient sodium hydroxide to impart a slight alkalinity to Clayton Yellow. Subsequently, sodium sulfhydrate (89 parts 100%) was added. A temperature of approximately 83° C. was maintained for one hour. The dye was removed by filtration and washed with 20% sodium chloride solution. Subsequently, it was dried at 80° C.

The dye was much higher in tinctorial strength than the products of Examples II and III, and gave blue cotton dyeings, both with and without diazotization and development on the fiber with beta-naphthol, which were consistently greener and brighter. The yield was essentially the same as that of Example IV.

Improved results similar to those described in Examples IV and V were obtained by employing equivalent amounts of sodium sulfide instead of sodium sulfhydrate in the processes of Examples IV and V.

The proportion of alkali metal chloride to water in the reduction medium should be at least sufficient to hold the major portion of the unreduced and reduced compounds out of solution, i. e. the concentration of alkali metal chloride should be at least 5% by weight. The preferred range is about 10% to about 30% by weight but more can be used. The alkali metal chloride may be present in any amount which will not prevent a mobile mixture and the presence of an aqueous liquid reduction medium but more alkali metal chloride than that which will dissolve in the solvent represents an unnecessary excess. From the standpoint of economy sodium chloride is preferred but other alkali metal chlorides can be used, such as potassium chloride.

Convenient forms of sodium sulfhydrate and sodium sulfide for use in the processes of the invention are the crystalline forms which are generally represented by the formulae $NaHS \cdot 2H_2O$ and $Na_2S \cdot 9H_2O$ respectively. Any alkali metal sulfhydrate or sulfide can be used, such as potassium sulfhydrate, but sodium sulfhydrate is the preferred reducing agent. Any amount of alkali metal sulfhydrate or sulfide which is sufficient to effect the selective reduction is satisfactory but from the standpoint of economy it is preferred to use only a small excess.

The reduction is advantageously conducted at temperatures of about 50° C. to a temperature just below the boiling point, say about 99° C., but the best results are obtained at about 80° C. to about 85° C. The reduction medium is preferably slightly basic, such as slight alkalinity to Clayton Yellow paper but more or less than slight alkalinity to Clayton Yellow paper can be employed.

Other tetrakisazo compounds besides those enumerated in the foregoing examples can be selectively reduced according to the invention to give superior results similar to those set forth. The second component (middle component) of such compounds is represented as Cleves acid and may be the radical of 1-naphthylamine-6- or 1-naphthylamine-7-sulfonic acid, or a mixture of the two. The final component is the radical of 5,5'-dihydroxy-2,2'-dinaphthylamine-7,7'-disulfonic acid (Rhoduline acid) and is represented by the symbol M. The arrows point from the compound which is diazotized and toward the compound which acts as a coupling component. As illustrations of such compounds are mentioned: 4-nitro-2-chloro-aniline → Cleves acid → M ← Cleves acid ← 4-nitro-2-chloro-aniline, 4-nitro-3-chloro-aniline → Cleves acid → M ← Cleves acid ← 4-nitro-3-chloro-aniline, 4-nitro-2-methyl-aniline → Cleves acid → M ← Cleves acid ← 4-nitro-2-methyl-aniline, 4-nitro-3-methoxy-aniline → Cleves acid → M ← Cleves acid ← 4-nitro-3-methoxy-aniline, 4-nitro-2-methoxy-aniline → Cleves acid → M ← Cleves acid ← 4-nitro-2-methoxy-aniline and 4-nitro-aniline → Cleves acid → M ← Cleves acid ← 4-nitro-aniline, 4-nitro-aniline-2-carboxylic acid → Cleves acid → M ← Cleves acid ← 4-nitro-aniline-2-carboxylic acid, 3-nitro-aniline → Cleves acid → M ← Cleves acid ← 3-nitro-aniline, 3-nitro-4-methyl-aniline → Cleves acid → M ← Cleves acid ← 3-nitro-4-methyl-aniline, 4-nitro-2-amino-anisole → Cleves acid → M ← Cleves acid ← 4-nitro-2-amino-anisole.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises heating a mixture containing an alkaline aqueous alkali metal chloride solution and a compound represented by the formula

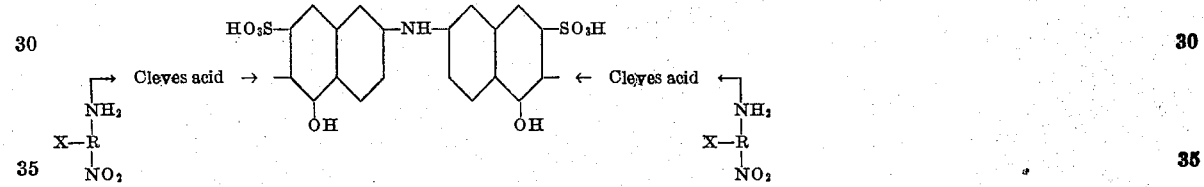

in which $NO_2$ and $NH_2$ are meta or para to each other, R is a radical of the benzene series and X is one of a group consisting of hydrogen, alkyl, alkoxy, halogen, carboxy and sulfonic acid, said alkali metal chloride being present in at least sufficient quantity to maintain the major portion of said product as undissolved material; heating to temperatures from about 50° C. to a temperature not in excess of the boiling point; adding at least sufficient of a compound of the group consisting of an alkali metal sulfhydrate and an alkali sulfide to reduce the nitro groups of said compound to amino groups; and continuing said heating until said nitro groups are reduced to amino groups.

2. The process in accordance with claim 1 in which the solution of alkali metal chloride contains about 5% to about 30% by weight of sodium chloride, the reducing agent is sodium sulfhydrate and the temperature is about 50° C. to about 99° C.

3. The process in accordance with claim 1 in which the solution of alkali metal chloride contains about 10% to about 30% by weight of sodium chloride, the reducing agent is sodium sulfhydrate and the temperature is about 80° C. to about 85° C.

4. The process which comprises adding to an alkaline aqueous solution containing about 10% to about 30% of sodium chloride a compound represented by the formula

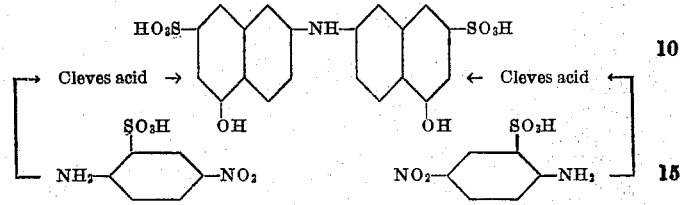

heating to about 80° C. to about 85° C.; adding at least sufficient sodium sulfhydrate to reduce the nitro groups to amino; and continuing said heating until the nitro groups are reduced to amino.

5. The process which comprises adding sodium chloride in the proportion of about 7000 parts by weight to an aqueous solution consisting of about 28,000 parts by weight and containing the tetrakisazo compound and the products resulting from diazotizing about 218 parts by weight of 4-nitro-2-sulfonic acid with about 69.2 parts by weight of sodium nitrite in about 4000 parts by weight of water and about 100 parts by weight of 100% hydrochloric acid, coupling by adding a solution of about 223 parts by weight of Cleves acid in about 3000 parts by weight of water containing about 53 parts by weight of sodium carbonate and about 150 parts by weight of sodium acetate, diazotizing the resulting monazo compound by adding about 84 parts by weight of sodium nitrite and about 225 parts by weight of 100% hydrochloric acid and coupling by adding said diazo solution to a mixture of about 5000 parts by weight of water containing about 718 parts sodium bicarbonate and about 5000 parts by weight of 5,5'-dihydroxy-2,2-di-naphthylamine-7,7'-disulfonic acid; heating to about 80° C. to about 85° C.; making the mixture slightly basic; adding about 89 parts of sodium sulfhydrate and continue heating until the nitro groups of the tetrakisazo compound are reduced to amino.

SWANIE S. ROSSANDER.